(12) United States Patent
Yook et al.

(10) Patent No.: US 12,407,637 B2
(45) Date of Patent: Sep. 2, 2025

(54) METHOD FOR PROVIDING CORE CONVERSATION PREVIEW OF UNREAD CONVERSATIONS, AND APPARATUS FOR IMPLEMENTING THE SAME

(71) Applicant: SAMSUNG SDS CO., LTD., Seoul (KR)

(72) Inventors: Ju Yeon Yook, Seoul (KR); Kyea Min Jeon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/384,145

(22) Filed: Oct. 26, 2023

(65) Prior Publication Data
US 2024/0146679 A1  May 2, 2024

(30) Foreign Application Priority Data
Oct. 28, 2022 (KR) .................. 10-2022-0141489

(51) Int. Cl.
*H04L 51/216* (2022.01)
*H04L 51/04* (2022.01)

(52) U.S. Cl.
CPC ............ *H04L 51/216* (2022.05); *H04L 51/04* (2013.01)

(58) Field of Classification Search
CPC .............................. H04L 51/216; H04L 51/04
See application file for complete search history.

(56) References Cited

U.S. PATENT DOCUMENTS

| | | | | |
|---|---|---|---|---|
| 8,443,041 B1 * | 5/2013 | Krantz | ................... | H04L 51/04 |
| | | | | 709/224 |
| 9,913,114 B1 * | 3/2018 | Wu | ........................ | G06T 11/60 |
| 11,263,407 B1 * | 3/2022 | Jawale | ................. | G06F 40/166 |
| 11,281,358 B2 * | 3/2022 | Li | ........................ | G06F 3/0482 |
| 11,444,896 B1 * | 9/2022 | Kwon | ................... | H04L 51/216 |
| 2007/0016585 A1 * | 1/2007 | Nickell | ................. | G06F 16/951 |
| 2013/0218987 A1 * | 8/2013 | Chudge | ................. | H04L 51/043 |
| | | | | 709/206 |
| 2015/0026590 A1 * | 1/2015 | Shirzadi | ............. | H04M 1/7243 |
| | | | | 715/751 |
| 2016/0147387 A1 * | 5/2016 | Rahman | ............... | G06F 40/258 |
| | | | | 715/752 |
| 2016/0364368 A1 * | 12/2016 | Chen | .................... | G06Q 10/107 |
| 2017/0212631 A1 * | 7/2017 | Kim | ................... | G06F 3/04883 |
| 2021/0192822 A1 * | 6/2021 | Ko | ....................... | G06F 3/04847 |
| 2022/0027559 A1 * | 1/2022 | Wang | .................... | G06F 40/289 |
| 2022/0255889 A1 * | 8/2022 | Deole | .................. | H04L 51/046 |
| 2022/0417197 A1 * | 12/2022 | Kim | ...................... | H04L 51/216 |

(Continued)

FOREIGN PATENT DOCUMENTS

CN    110233931 A    9/2019
CN    112351142 B    3/2022

(Continued)

*Primary Examiner* — Alina A Boutah
*Assistant Examiner* — Adam A Cooney
(74) *Attorney, Agent, or Firm* — Sughrue Mion, PLLC

(57) ABSTRACT

A method for providing a core conversation preview of an unread conversation, the method being performed by at least one processor and includes: determining, in response to an input for a first chat room in a list of chat rooms, at least one core conversation of unread conversations included in the first chat room; and displaying a preview window comprising the at least one core conversation.

13 Claims, 9 Drawing Sheets

(56) References Cited

U.S. PATENT DOCUMENTS

| | | | | |
|---|---|---|---|---|
| 2023/0275854 A1* | 8/2023 | Isayeva | ............... | H04L 12/1827 709/206 |
| 2023/0410047 A1* | 12/2023 | Lin | .................... | H04L 12/1822 |
| 2024/0103695 A1* | 3/2024 | Wang | .................. | G06F 3/04845 |
| 2024/0146670 A1* | 5/2024 | Jiang | .................... | H04L 51/216 |

FOREIGN PATENT DOCUMENTS

| | | | |
|---|---|---|---|
| CN | 114640741 | A | 6/2022 |
| JP | 2019-215865 | A | 12/2019 |
| JP | 7042917 | B2 | 3/2022 |
| KR | 10-2007-0103256 | A | 10/2007 |
| KR | 10-2019-0126066 | A | 11/2019 |
| KR | 10-2110457 | B1 | 5/2020 |
| KR | 10-2121035 | B1 | 6/2020 |

\* cited by examiner

METHOD FOR PROVIDING CORE CONVERSATION PREVIEW OF UNREAD CONVERSATIONS, AND APPARATUS FOR IMPLEMENTING THE SAME

CROSS-REFERENCE TO RELATED APPLICATION(S)

This application is based on and claims priority under 35 U.S.C. § 119 to Korean Patent Application No. 10-2022-0141489, filed on Oct. 28, 2022, in the Korean Intellectual Property Office, the disclosure of which is incorporated by reference herein in its entirety.

BACKGROUND

1. Field

The disclosure relates to a method for providing a core conversation preview of unread conversations, and an apparatus for implementing the same. More particularly, the disclosure relates to a method for providing a core conversation preview of unread conversations in order to provide a core conversation preview function among unread conversations in a chat room, and an apparatus for implementing the same.

2. Description of the Related Art

Messenger services provide speediness capable of exchanging real-time messages in a one-to-one or one-to-many manner, but in the messenger services, when a notification confirmation or a reply is delayed, an overload may be caused in confirming the messages, and thus, a conversation partner needs to wait for a message reception confirmation and an answer, which is troublesome.

In particular, in the case of a corporate messenger service, due to business characteristics, each of employees should confirm all messages received by herself and grasp important contents among all messages. In addition, each of employees has a sense of duty to answer a question relevant to her business in conversation contents or directly directed to himself/herself.

Accordingly, there is a problem that most employees should spend a lot of time to read and understand the messages and experience the inconvenience of unnecessary and inefficient manipulations for entering and exiting a plurality of chat rooms.

Accordingly, in the messenger service, there is a need for a technology for easily grasping core messages without entering all chat rooms one by one and confirming messages when unread messages are accumulated.

In addition, it is necessary to provide an interface capable of sending quick replies to a plurality of chat room members or opening a new chat window to a one-on-one member without movement of a screen for exiting and entering the chat room while confirming the core messages.

SUMMARY

Aspects of the disclosure provide a method for providing a core conversation preview of unread conversations capable of providing a convenient interface so as to identify core conversations without confirming unread conversations in a chat room one by one on a messenger, and an apparatus for implementing the same.

Aspects of the disclosure also provide a method for providing a core conversation preview of unread conversations capable of providing an interface that may quickly confirm core conversations of unread conversations in a chat room without movement of a screen and send quick replies to members of the chat room on a messenger, and an apparatus for implementing the same.

Aspects of the disclosure also provide a method for providing a core conversation preview of unread conversations capable of dramatically reducing the number of user manipulations required to grasp core conversations of unread conversations in a chat room on a messenger, and an apparatus for implementing the same.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of the disclosure, a method for providing a core conversation preview of an unread conversation, the method being performed by at least one processor and includes: determining, in response to an input for a first chat room in a list of chat rooms, at least one core conversation of unread conversations included in the first chat room; and displaying a preview window including the at least one core conversation.

In some embodiments, the determining of the at least one core conversation includes, based on a determination that a preset trigger condition is satisfied, determining the at least one core conversation of the unread conversations in the first chat room in response to the input for the first chat room in the list of chat rooms.

In some embodiments, the determination that the preset trigger condition is satisfied is performed based on at least one of: a number of unread conversations included in the first chat room, a number of recent clicks on the first chat room, a number of members of the first chat room, a frequency and a number of conversations with members of the first chat room, a number of conversation inputs by a user in the first chat room, a number of members of which a number of conversations with the user in the first chat room is greater than or equal to a reference value, or a similarity between the first chat room and a profile of the user.

In some embodiments, the determining of the at least one core conversation includes displaying an indicator indicating that a determination of the at least one core conversation is completed.

In some embodiments, the determining of the at least one core conversation includes determining the at least one core conversation based on a determination that each of the unread conversations corresponds to at least one of: relevance to a recent conversation, relevance to business in charge, a conclusion or changes, a type of requesting a response from a conversation partner, a mention of a name of a user, a time or a date, or feedback.

In some embodiments, the determining of the at least one core conversation includes excluding sentences including at least one of: a pictorial symbol, an onomatopoeic word, a mimetic word, an emoticon, an emoji, a special symbol, or a repetition of consonants and/or vowels among the unread conversations in determining the at least one core conversation.

In some embodiments, the displaying of the preview window including the at least one core conversation includes: classifying the first chat room as a conversation type of a plurality of conversation types; and adjusting a weight of each of criteria for the at least one core conversation based on the conversation type of the first chat room.

In some embodiments, the method further includes displaying an execution result of a function corresponding to a type of user manipulation based on the user manipulation on the preview window.

In some embodiments, the displaying of the execution result of the function corresponding to the type of the user manipulation includes, based on a determination that a pinch-out input for a first conversation and a second conversation continuously displayed on the preview window is received, displaying conversations existing between the first conversation and the second conversation of the unread conversations.

In some embodiments, the displaying of the execution result of the function corresponding to the type of the user manipulation includes, based on a determination that a continuous first type of user input for each of a plurality of conversations of the at least one core conversation displayed on the preview window is received, displaying message input boxes each corresponding to the plurality of conversations and a send button collectively sending, to members of a corresponding conversation, texts input to the respective message input boxes.

In some embodiments, the displaying of the execution result of the function corresponding to the type of the user manipulation includes, based on a determination that a second type of user input for a first conversation of the at least one core conversation displayed on the preview window is received, generating and displaying a one-to-one chat room with a user relevant to the first conversation.

According to an aspect of the disclosure, a non-transitory computer-readable recording medium storing computer program, which, when executable by at least one processor, causes the at least one processor to execute: determine at least one core conversation of unread conversations in a first chat room in response to an input for the first chat room in a list of chat rooms; and display a preview window including the at least one core conversation.

According to an aspect of the disclosure, a messenger client terminal including: one or more processors; a memory configure to load a computer program executed by the one or more processors; and wherein the computer program includes instructions for performing: determining at least one core conversation of unread conversations included in a first chat room in response to an input for the first chat room in a list of chat rooms; and displaying a preview window including the at least one core conversation.

In some embodiments, the determining of the at least one core conversation includes determining the at least one core conversation based on a determination that each of the unread conversations corresponds to at least one of: relevance to business in charge, a conclusion or changes, a type of requesting a response from a conversation partner, a mention of a name of a user, a time or a date, or feedback.

In some embodiments, the computer program further includes instructions for displaying an execution result of a function corresponding to a type of user manipulation based on the user manipulation on the preview window, and wherein the displaying of the execution result of the function corresponding to the type of the user manipulation includes, when based on a determination that a continuous first type of user input for each of a plurality of conversations of the at least one core conversation displayed on the preview window is received, displaying message input boxes each corresponding to the plurality of conversations and a send button collectively sending, to members of a corresponding conversation, texts input to the respective message input boxes.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Figure 1:
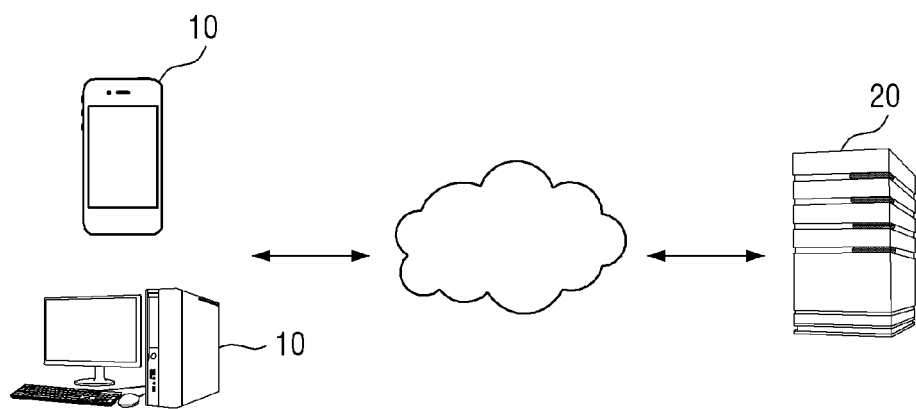
FIG. 1 is a diagram illustrating a configuration of a system for providing a core conversation preview according to an example embodiment of the disclosure.

Hereinafter, preferred embodiments of the disclosure will be described with reference to the attached drawings. The advantages and features of the disclosure and methods of accomplishing the same may be understood more readily by reference to the following detailed description of preferred embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims.

In adding reference numerals to the components of each drawing, the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

The terms "transmit", "receive", and "communicate" as well as the derivatives thereof encompass both direct and indirect communication. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more.

Hereinafter, some embodiments of the disclosure will be described in detail with reference to the accompanying drawings.

FIG. 1 is a diagram illustrating a configuration of a system for providing a core conversation preview of unread conversations according to an example embodiment of the disclosure. Referring to FIG. 1, the system according to an example embodiment of the disclosure includes a messenger client terminal 10 and a server 20, and the messenger client terminal 10 is connected to the server 20 through a network.

The messenger client terminal 10 may be implemented as a terminal that provides information on core conversations of unread conversations in a specific chat room on a messenger. In this case, the messenger client terminal 10 may receive various information related to the specific chat room and a user from the server 20 in order to provide the information on the core conversations. The messenger client terminal 10 may be, for example, any one of a mobile computing apparatus such as a smartphone, a tablet personal computer (PC), a wearable device, a smart watch, a laptop computer, and a personal digital assistant (PDA), and a fixed computing apparatus such as a desktop PC.

When a first chat room of a plurality of chat rooms is selected by a user input while the messenger client terminal 10 displays a list of chat rooms on the messenger, the messenger client terminal 10 determines core conversations of unread conversations included in the selected first chat room.

In this case, an analysis operation for determining the core conversations may be executed only when a preset trigger condition is satisfied.

As an example embodiment, the messenger client terminal 10 may determine the core conversations based on whether or not each of the unread conversations corresponds to at least one of relevance to business in charge, a conclusion or changes, a type of requesting a response from a conversation partner, a time or a date, and feedback.

The messenger client terminal 10 displays a preview window including the core conversations determined as described above. In this case, the messenger client terminal 10 may sort and display the core conversations based on different criteria according to which conversation type the specific chat room corresponds to.

As an example embodiment, the messenger client terminal 10 may display execution results of different functions according to a type of user manipulation on the preview window. Here, the user manipulation may include, for example, a pinch-out/in manipulation, a continuous long press manipulation, a double-tap manipulation, and the like. In addition, the different functions may include, for example, a function of displaying conversations between two core conversations, a function of creating a message input box for each conversation, a function of creating a one-to-one chat room, and the like.

According to the configuration of the system of the disclosure as described above, it is possible to provide a convenient interface so as to identify the core conversations without confirming the unread conversations in the chat room one by one on the messenger. In addition, it is possible to provide an interface that may quickly confirm the core conversations of the unread conversations without movement of a screen and send quick replies to members of the chat room.

Figure 2:
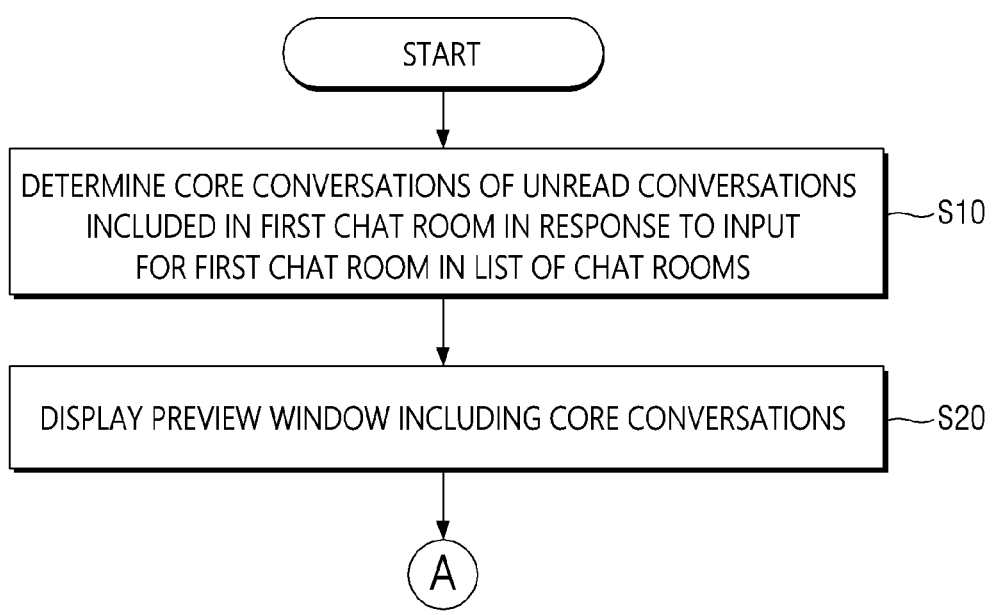
FIG. 2 is a flowchart for describing a method for providing a core conversation preview of unread conversations according to an example embodiment of the disclosure.

FIG. 2 is a flowchart for describing a method for providing a core conversation preview of unread conversations according to an example embodiment of the disclosure.

The method for providing a core conversation preview of unread conversations according to an example embodiment of the disclosure may be executed by the messenger client terminal 10 illustrated in FIG. 1. The messenger client terminal 10 executing the method according to the present example embodiment may be a computing device 100 illustrated in FIG. 9. The messenger client terminal 10 may be, for example, an apparatus capable of performing an arithmetic function, such as a smartphone, a tablet PC, a laptop computer, or a PC.

A description of a subject performing some operations included in the method according to an example embodiment of the disclosure may be omitted, and in such a case, the subject is the messenger client terminal 10.

According to an example embodiment of the disclosure to be described later, it is possible to allow a user to quickly confirm core conversations of unread conversations in a chat room without movement of a screen on a messenger.

First, in operation S10, the messenger client terminal 10 determines core conversations of unread conversations included in a first chat room in response to an input for the first chat room in a list of chat rooms.

As an example embodiment, an analysis operation for determining the core conversations may be executed only when a preset trigger condition is satisfied. Here, the trigger condition may include, for example, at least one of the number of unread conversations included in the first chat room, the number of recent clicks on the first chat room, the number of members of the first chat room, the frequency and the number of conversations with members of the first chat room, the number of conversation inputs by the user in the first chat room, the number of members of which the number of conversations with the user in the first chat room is greater than or equal to a reference value, and a similarity between the first chat room and a profile of the user.

For example, an analysis algorithm for determining core conversations of unread conversations may be executed for a chat room in which unread messages received by the user are greater than or equal to a reference value or the number of recent clicks is greater than or equal to a reference value among a plurality of chat rooms. In this case, when the user selects the corresponding chat room, the analysis algorithm has already been executed, such that the determination of the core conversations has been completed, and thus, information on the core conversations may be provided immediately.

As another example, in the case of a chat room in which the preset trigger condition is satisfied, an analysis algorithm is executed at a point in time when user selects the chat room, such that core conversations may be determined.

As an example embodiment, the messenger client terminal 10 may display a preset indicator for the chat room in which the determination of the core conversations has been completed by execution of the analysis algorithm. As another example, the messenger client terminal 10 may display an indicator for the chat room in which the preset trigger condition is satisfied. In this case, when the indicator is selected, an analysis algorithm for unread conversations in the corresponding chat room may be executed.

As an example embodiment, the messenger client terminal 10 may utilize conversation history data of the user in order to determine the core conversations for the unread conversations. As an example, the messenger client terminal 10 may analyze a business situation, previous conversation contents, messenger usage patterns, and the like, of the user based on the conversation history data of the user in a chat room in which the number of recent clicks is greater than or equal to a reference value or the frequency of answers of the user is greater than or equal to a reference value.

Accordingly, the messenger client terminal 10 may decide whether or not each of the unread conversations in the corresponding chat room is the core conversation using contents analyzed based on the conversation history data of the user.

In this case, the messenger client terminal 10 may decide the importance of each of the unread conversations based on the contents analyzed based on the conversation history data of the user, and determine whether or not each conversation is the core conversation according to the importance. Here, a criterion for deciding the importance of each conversation may include, for example, relevance to a recent conversation, relevance to business in charge, a conclusion or changes, a type of requesting a response from a conversation partner, a mention of a name of the user, a time or a date, and feedback.

That is, a conversation decided to have high importance according to the criterion may be determined as the core conversation.

In addition, the messenger client terminal 10 may classify each of the unread conversations into a plurality of conversation types, and change a criterion for deciding the importance of each conversation or adjust a weight for each of criteria for deciding the importance depending on which conversation type each conversation corresponds to.

As an example, the messenger client terminal 10 may classify a type of chat room as an instruction/report type when a ratio of the number of utterance persons to the total number of persons in the chat room is equal to or smaller than a reference value, and in this case, the messenger client terminal 10 may perform an adjustment for increasing an importance weight of a conversation including a conclusion-related keyword.

As another example, the messenger client terminal 10 may classify a type of chat room as a business type when conversations in the chat room are relevant to business, and in this case, the messenger client terminal 10 may perform an adjustment for increasing an importance weight of a conversation including a conclusion, request, or feedback-related keyword.

As still another example, the messenger client terminal 10 may classify a type of chat room as a business-irrelevant type when conversations in the chat room are irrelevant to business, and in this case, the messenger client terminal 10 may perform an adjustment for increasing an importance weight of a conversation including a feedback-related keyword.

In addition, the messenger client terminal 10 may classify a type of a chat room as a business-vacuum type when conversations in the chat room are relevant to business and a time difference between the respective conversations is greater than or equal to a reference value, and in this case, the messenger client terminal 10 may lower weights of criteria for deciding the importance of the respective conversations and simply display the respective conversations in chronological order according to a timeline.

Accordingly, the messenger client terminal 10 may decide the importance of each of the unread conversations using the criteria exemplified above, and may determine a conversation having a high importance as the core conversation.

As an example embodiment, the messenger client terminal 10 may exclude sentences including at least one of a pictorial symbol, an onomatopoeic word, a mimetic word, an emoticon, an emoji, a special symbol, and a repetition of consonants/vowels among the unread conversations in determining the core conversations. In addition, sentences irrelevant to the business among the unread conversations may be excluded. Even though the core conversation has been removed in one conversation bubble, when contents relevant to the business are included, an exception may be made to an exclusion condition.

However, even though some sentences irrelevant to the business are included in the unread conversation, when the remaining sentences correspond to a conversation having a high importance, the unread conversation may be determined as the core conversation.

Next, in operation S20, the messenger client terminal 10 displays a preview window including the core conversations determined in operation S10.

Figure 5:
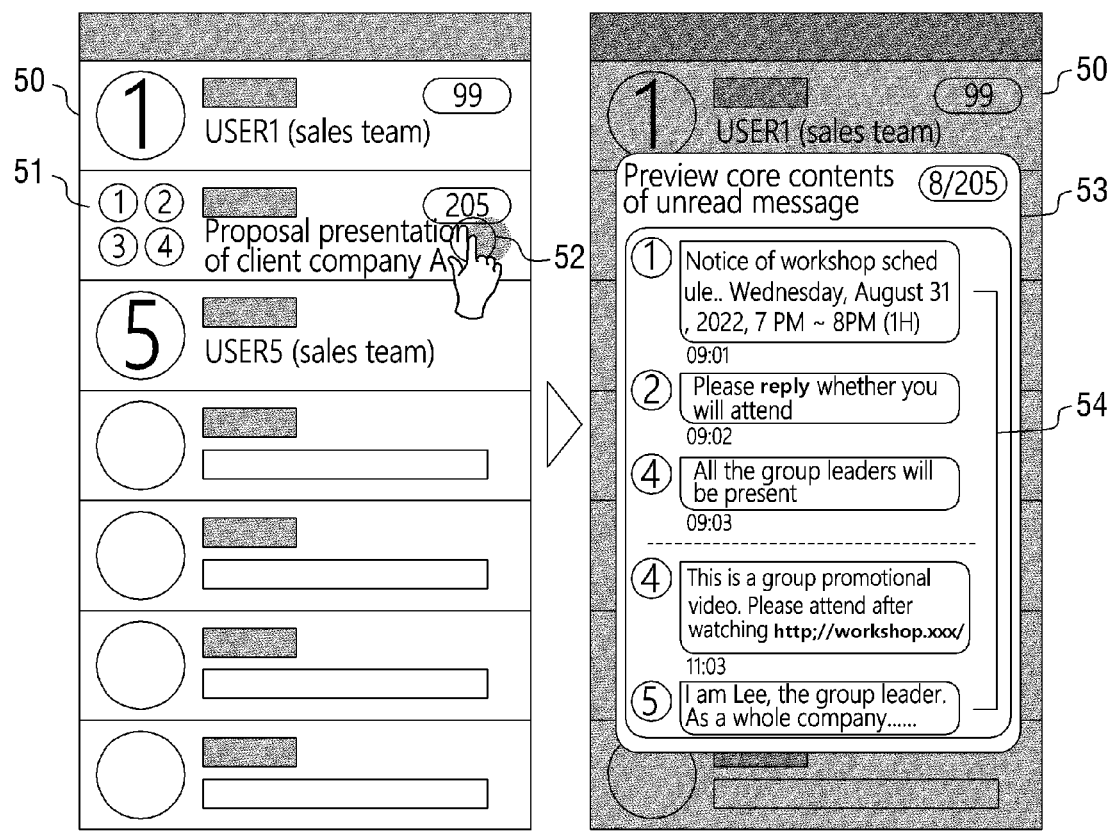
FIG. 5 is an example of providing a preview window of core conversations of unread conversations included in a first chat room according to a user input according to some example embodiments of the disclosure.

As an example, referring to FIG. 5, when a long press input 52 for a first chat room 51 is received while the messenger client terminal 10 displays a list 50 of chat rooms on a messenger, the messenger client terminal 10 may display a preview window 53 including only core conversations 54 of unread conversations in the first chat room 51.

Accordingly, it is possible to quickly confirm the core conversations without confirming the unread conversations in the chat room one by one. In addition, it is possible to grasp core contents of a desired chat room only by an operation of selecting the desired chat room in a state in which the list of the chat rooms is displayed, without a scrolling manipulation for confirming the unread conversations after entering the chat room.

As an example embodiment, when any one chat room is selected from the list of the chat room, the messenger client terminal 10 may display different screens depending on whether or not the selected chat room is a chat room in which the determination of the core conversations has been completed by the execution of the analysis algorithm. As an example, when the selected chat room is the chat room in which the determination of the core conversations has been completed, a preview window including the core conversations may be displayed. On the other hand, when the selected chat room is a chat room for which the analysis algorithm is not executed, a pop-up window showing all conversations included in the chat room may be displayed.

As an example embodiment, the messenger client terminal 10 may classify the first chat room as any one of a plurality of conversation types and sort and display the core conversations based on different criteria according to a conversation type of the first chat room, in displaying the preview window including the core conversations. In this case, the plurality of conversation types may include, for example, a business-vacuum type, an instruction or report type, a business type, and a business-irrelevant type.

As an example, when the user of the first chat room has a long vacuum in business hours due to outside duty or on annual leave, the core conversations of the first chat room displayed on the preview window may be sorted and displayed in chronological order, regardless of a type of each conversation.

In addition, when the conversations in the first chat room are in an instruction or report type by one or two representative members, only conversations corresponding to a conclusion or changes, or a type of requesting a response from a conversation partner among the core conversations of the first chat room displayed on the preview window may be extracted and displayed.

On the other hand, when the conversations in the first chat room are in a business type composed of business-relevant subjects by persons in charge of the business, only conversations corresponding to relevance to business in charge, a conclusion or changes, and feedback among the core conversations of the first chat room displayed on the preview window may be extracted and displayed.

In addition, when the conversations in the first chat room are in a business-irrelevant type, only conversations corresponding to feedback among the core conversations in the first chat room displayed on the preview window may be extracted and displayed.

According to the example embodiment as described above, it is possible to provide information of the core conversations suitable for a situation of the user by analyzing the conversation type of the chat room and extracting and displaying only the core conversations appropriate for the conversation type of the chat room using an analysis result, in displaying the preview window including the core conversations of the unread conversations.

Figure 3:
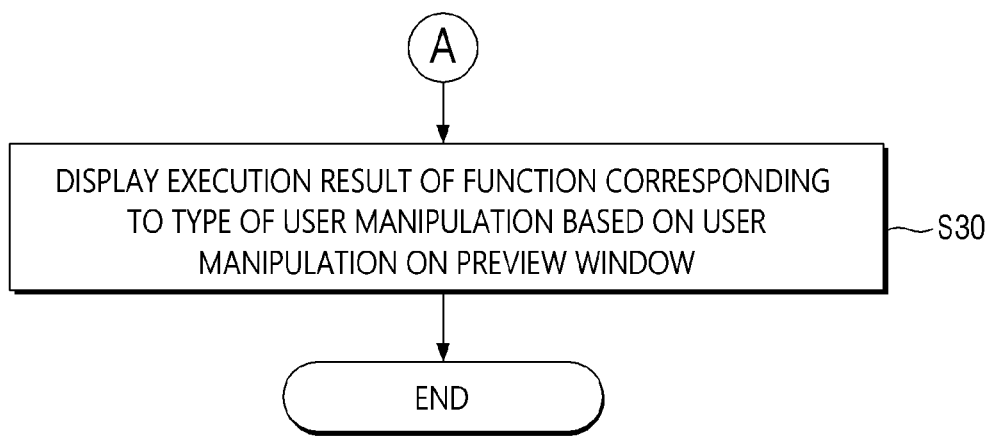
FIG. 3 is a flowchart for describing an operation additionally performed after operations of FIG. 2 are performed.

As an example embodiment, referring to FIG. 3, after the operation S10 and the operation S20 in FIG. 2 are performed, an operation S30 may be additionally executed.

In operation S30, the messenger client terminal 10 displays an execution result of a function corresponding to a type of user manipulation based on the user manipulation on the preview window including the core conversations displayed in operation S20.

Figure 4:
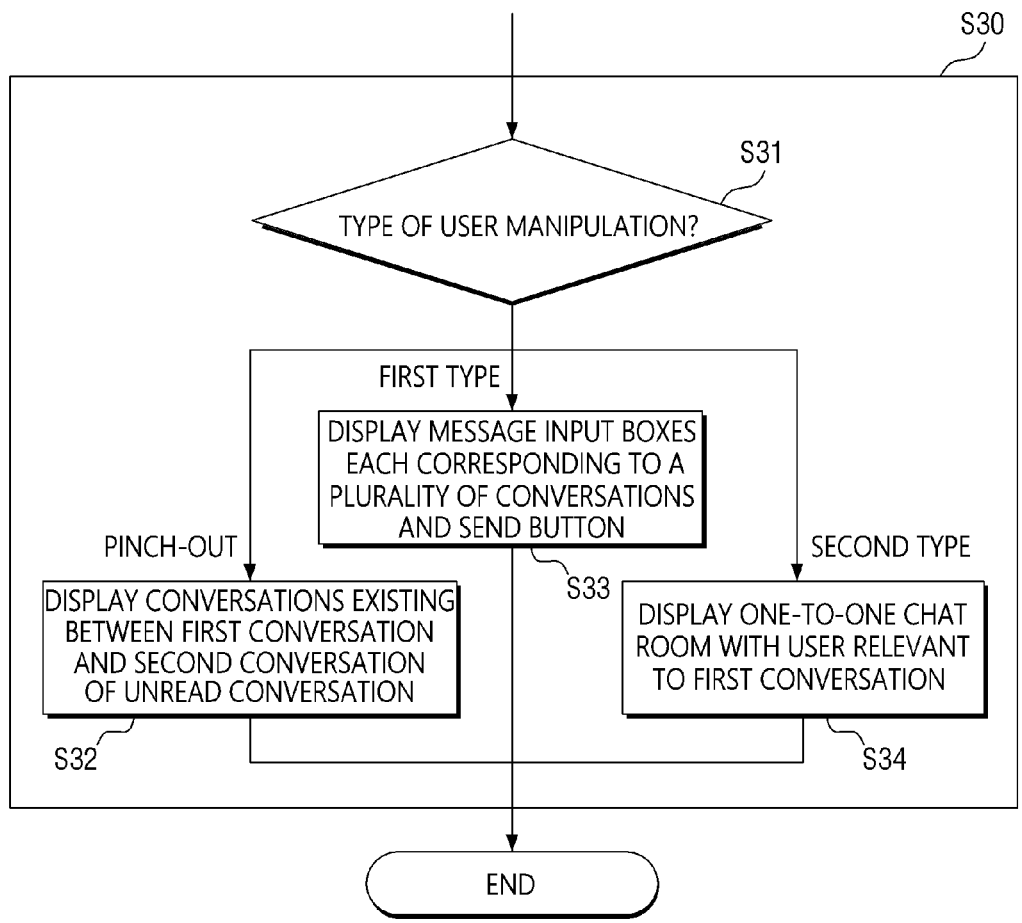
FIG. 4 is a flowchart for describing detailed processes of a step illustrated in FIG. 3.

In this case, as illustrated in FIG. 4, the operation S30 may include an operation S31 of deciding the type of user manipulation and operations S32 to S34 of executing different functions depending on the type of user manipulation.

When the type of user manipulation on the preview window is a pinch-out input for two neighboring conversations in operation S31, the messenger client terminal 10 may display conversations existing between a first conversation and a second conversation, which are the core conversations of the unread conversations, in operation S32. In this case, the conversations existing between the first conversation and the second conversation may be displayed according to a timeline in which each conversation is recorded.

When the first conversation and the second conversation, which are core conversations, are sorted in the reverse order of the timeline, the conversations existing between the first conversation and the second conversation may also be displayed in the reverse order of the timeline.

Figure 6:
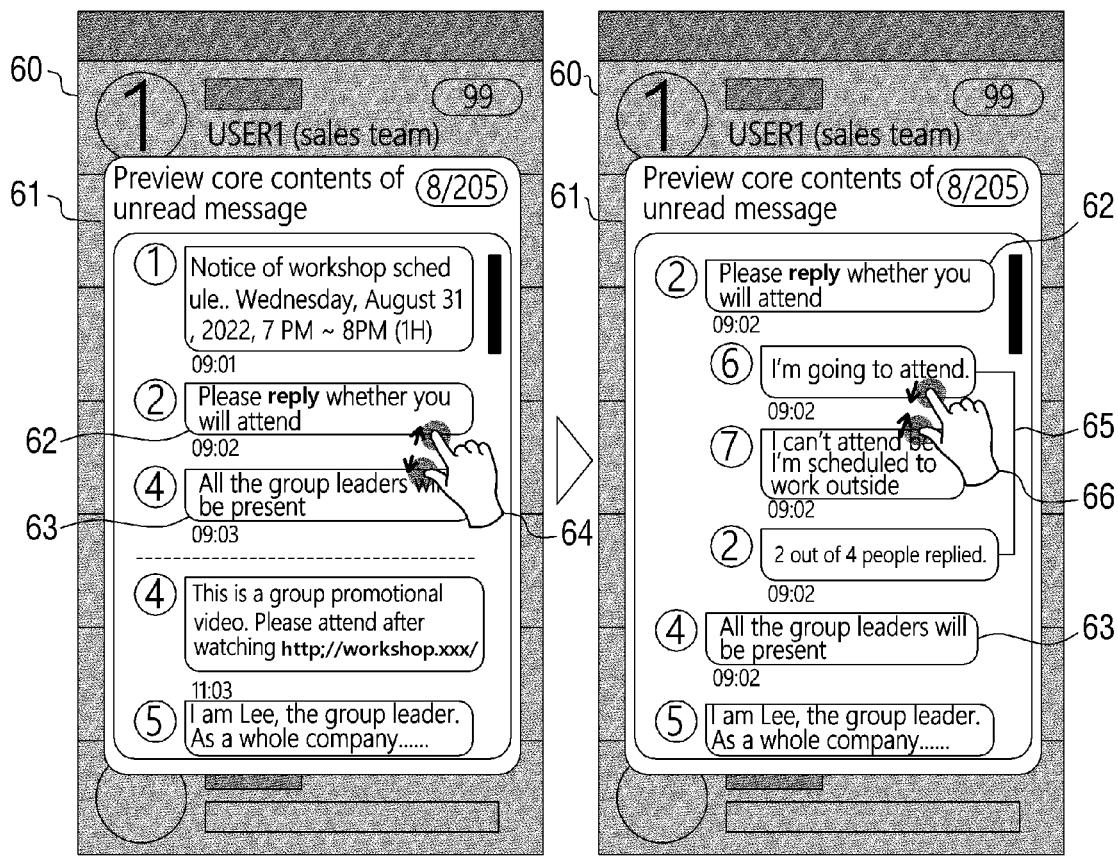
FIG. 6 is an example of displaying conversations between two core conversations according to a pinch-out manipulation according to some example embodiments of the disclosure.

As an example, in an example of FIG. 6, the messenger client terminal 10 may displays core conversations on a preview window 61 displayed on a list 60 of chat rooms, and display non-core conversations 65 existing between a first core conversation 62 and a second core conversation 63 when a pinch-out input 64 for the first core conversation 62 and the second core conversation 63 of the core conversations is received. In this case, when a pinch-in input 66 for the first core conversation 62 and the second core conversation 63 is received in a state in which the messenger client terminal 10 displays the non-core conversations 65, the messenger client terminal 10 may display the core conversations on the preview window 61 in an original state in which other conversations are not included between the first core conversation 62 and the second core conversation 63.

According to the example embodiment as described above, it is possible to immediately confirm a history of conversations existing between two core conversations with a simple manipulation when it is difficult to grasp a situation with only the two core conversations while the messenger client terminal displays the core conversations of the unread conversations.

As an example embodiment, when the type of user manipulation on the preview window is a first type in operation S31, the messenger client terminal 10 may display message input boxes each corresponding to a plurality of core conversations of the unread conversations and a send button in operation S33.

Figure 7:
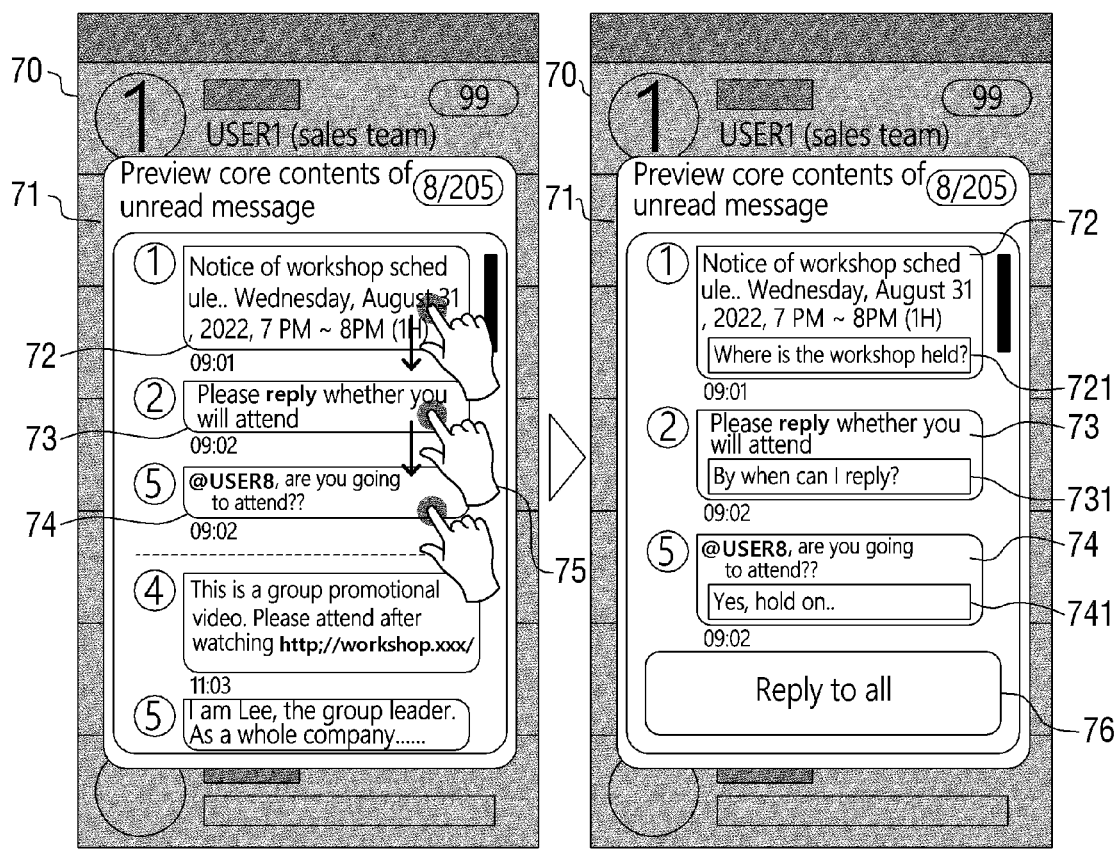
FIG. 7 is an example of collectively sending messages through message input boxes for each conversation displayed according to a continuous long press manipulation according to some example embodiments of the disclosure.

As an example, in an example of FIG. 7, the messenger client terminal 10 may display core conversations on a preview window 71 displayed on a list 70 of chat rooms, and may display message input boxes 721, 731, and 741 each corresponding to a first core conversation 72, a second core conversation 73, and a third core conversation 74 and a send button 76 that may collectively send messages each input to the message input boxes 721, 731, and 741 when a continuous long press input 75 for each of the first core conversation 72, the second core conversation 73, and the third core conversation 74 of the core conversations is received. In this case, when the messages are sent collectively by clicking the send button 76, the core conversations may be disposed in an original state in which the message input boxes 721, 731, and 741 are not displayed.

Accordingly, it is possible to create answer messages for each of a plurality of core conversations on the same screen and it is possible to collectively send the answer messages to conversation partners each corresponding to the plurality of core conversations, while the messenger client terminal displays the core conversations of the unread conversations. In this case, it is possible to reply to a plurality of members with only one click without moving a screen to a group chat room in which the plurality of members are included.

As an example embodiment, when the type of user manipulation on the preview window is a second type in operation S31, the messenger client terminal 10 may display a one-to-one chat room with a user relevant to the first conversation of the unread conversations in operation S34.

Figure 8:
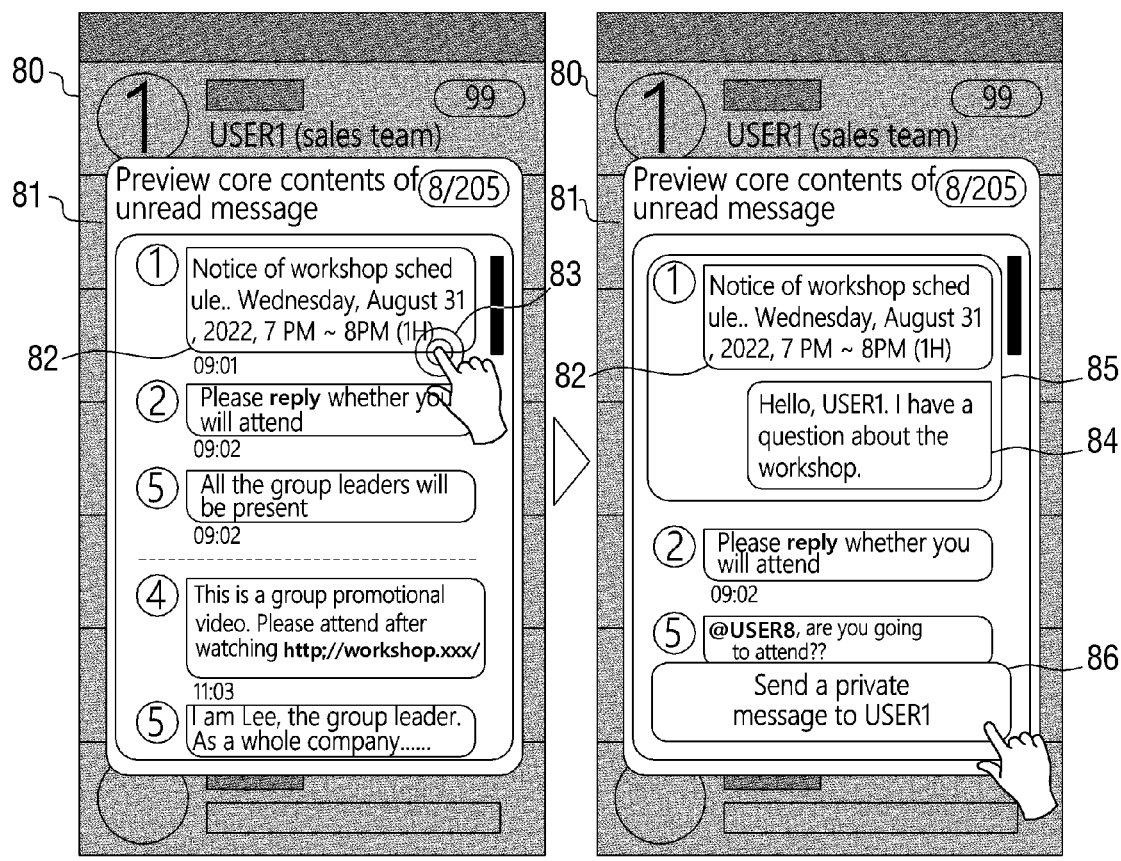
FIG. 8 is an example of sending a message through a one-to-one chat room created according to a double-tap manipulation according to some example embodiments of the disclosure.

As an example, in an example of FIG. 8, the messenger client terminal 10 may displays core conversations on a preview window 81 displayed on a list 80 of chat rooms, and generate and display a one-to-one chat room 85 including a message input box 84 corresponding to a first core conversation 82 when a double-tap input 83 for the first core conversation 82 of the core conversations is received. In this case, the messenger client terminal 10 may display a send button 86 capable of sending a message input to the message input box 84 to a conversation partner along with the one-to-one chat room 85.

Accordingly, it is possible to send a one-to-one message with a simple operation without needing to move a screen or return to a screen of the list of the chat rooms in order to generate a one-to-one chat room when a user should send a personal message to one of a plurality of members while the messenger client terminal displays the core conversations of the unread conversations.

According to the example embodiment of the disclosure as described above, it is possible to provide an interface that may quickly confirm the core conversations of the unread conversations in the chat room without movement of the screen and send quick replies to the members of the chat room on the messenger. In addition, it is possible to drastically reduce the number of user manipulations required to grasp the core conversations of the unread conversations in the chat room.

Figure 9:
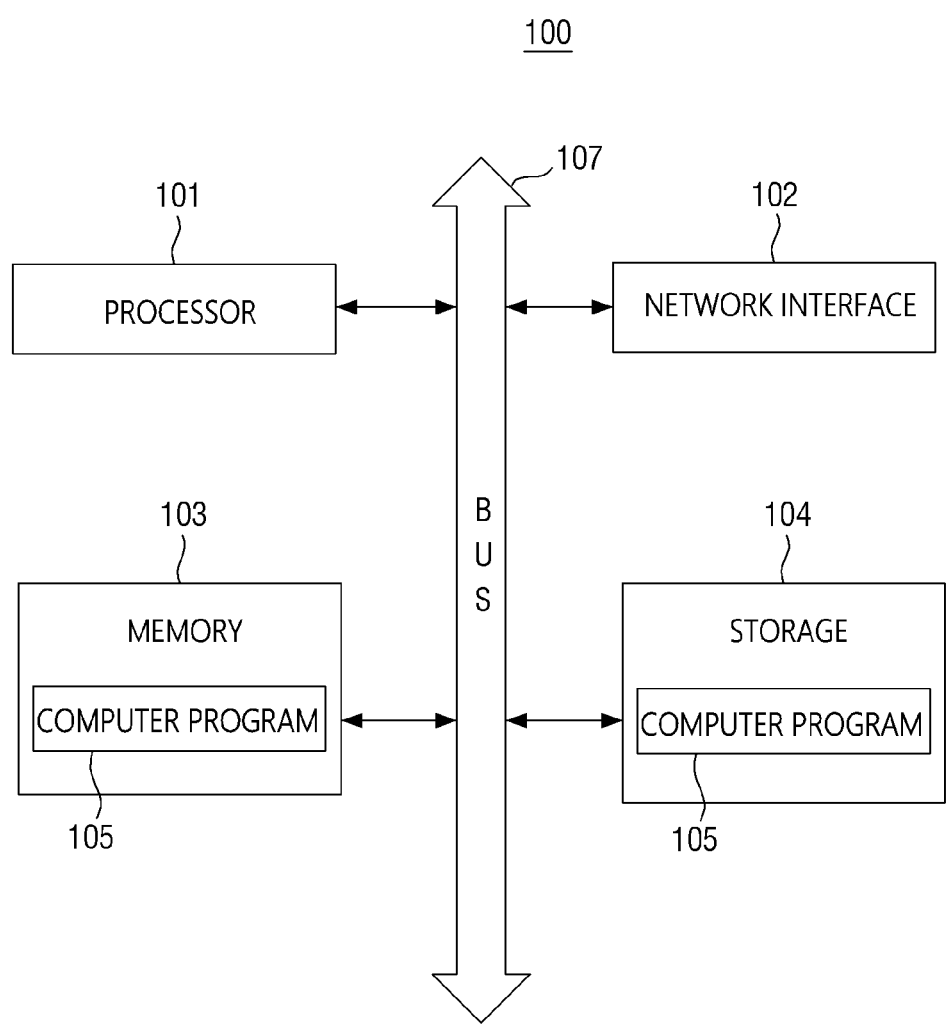
FIG. 9 is a hardware configuration diagram of an illustrative computing apparatus capable of implementing methods according to an example embodiment of the disclosure.

FIG. 9 is a hardware configuration diagram of an example computing device 100.

Referring to FIG. 9, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the disclosure. The computing device 100 may have one or more processors.

The memory 103 stores various data, instructions and/or information. The memory 103 may load one or more programs 105 from the storage 104 to execute methods/operations according to various embodiments of the disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the disclosure are implemented. When the computer program 105 is loaded on the memory 103, the processor 101 may perform the methods/operations in accordance with various embodiments of the disclosure by executing the one or more instructions.

As an example embodiment, the computer program 105 may include instructions for performing an operation of determining core conversations of unread conversations included in a first chat room in response to an input for the first chat room in a list of chat rooms and an operation of displaying a preview window including the core conversations.

The technical features of the disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the disclosure. Therefore, the disclosed preferred embodiments of the disclosure are used in a generic and descriptive sense only and not for purposes of limitation.

What is claimed is:

1. A method for providing a core conversation preview of an unread conversation, the method being performed by at least one processor and comprising:

determining, in response to an input for a first chat room in a list of chat rooms, core conversations of unread conversations included in the first chat room;

displaying a preview window comprising the core conversations; and in response to a user input for each of the core conversations being received consecutively on the preview window, displaying a message input box below each of the core conversations on the preview window.

2. The method of claim 1, wherein the determining of the core conversations comprises, based on a determination that a preset trigger condition is satisfied, determining the core conversations of the unread conversations in the first chat room in response to the input for the first chat room in the list of chat rooms.

3. The method of claim 2, wherein the determination that the preset trigger condition is satisfied is performed based on at least one of:

a number of unread conversations included in the first chat room, a number of recent clicks on the first chat room, a number of members of the first chat room, a frequency and a number of conversations with members of the first chat room, a number of conversation inputs by a user in the first chat room, a number of members of which a number of conversations with the user in the first chat room is greater than or equal to a reference value, or a similarity between the first chat room and a profile of the user.

4. The method of claim 1, wherein the determining of the core conversations comprises displaying an indicator indicating that a determination of the core conversations is completed.

5. The method of claim 1, wherein the determining of the core conversations comprises determining the core conversations based on a determination that each of the unread conversations corresponds to at least one of: relevance to a recent conversation, relevance to business in charge, a conclusion or changes, a type of requesting a response from a conversation partner, a mention of a name of a user, a time or a date, or feedback.

6. The method of claim 1, wherein the determining of the core conversations comprises excluding sentences comprising at least one of: a pictorial symbol, an onomatopoeia word, a mimetic word, an emoticon, an emoji, a special symbol, or a repetition of consonants and/or vowels among the unread conversations in determining the core conversations.

7. The method of claim 1, wherein the displaying of the preview window comprising the core conversations comprises:

classifying the first chat room as a conversation type of a plurality of conversation types; and adjusting a weight of each of criteria for the core conversations based on the conversation type of the first chat room.

8. The method of claim 1, further comprising displaying an execution result of a function corresponding to a type of user manipulation based on the user manipulation on the preview window.

9. The method of claim 8, wherein the displaying of the execution result of the function corresponding to the type of the user manipulation comprises, based on a determination that a pinch-out input for a first conversation and a second conversation continuously displayed on the preview window is received, displaying conversations existing between the first conversation and the second conversation of the unread conversations.

10. The method of claim 8, wherein the displaying of the execution result of the function corresponding to the type of the user manipulation comprises, based on a determination that a first type of a user input for a first conversation of the core conversations displayed on the preview window is received, generating and displaying a one-to-one chat room with a user relevant to the first conversation.

11. A non-transitory computer-readable recording medium storing computer program, which, when executable by at least one processor, causes the at least one processor to execute:

determine core conversations of unread conversations in a first chat room in response to an input for the first chat room in a list of chat rooms;

display a preview window comprising the core conversations; and in response to a user input for each of the core conversations being received consecutively on the preview window, display a message input box below each of the core conversations on the preview window.

12. A messenger client terminal comprising:

one or more processors;

a memory configured to load a computer program executed by the one or more processors; and wherein the computer program comprises instructions for performing:

determining core conversations of unread conversations included in a first chat room in response to an input for the first chat room in a list of chat rooms;

displaying a preview window comprising the core conversations; and in response to a user input for each of the core conversations being received consecutively on the preview window, displaying a message input box below each of the core conversations on the preview window.

13. The messenger client terminal of claim 12, wherein the determining of the core conversations comprises determining the core conversations based on a determination that each of the unread conversations corresponds to at least one of: relevance to business in charge, a conclusion or changes, a type of requesting a response from a conversation partner, a mention of a name of a user, a time or a date, or feedback.

* * * * *